United States Patent [19]
Page

[11] 3,858,574
[45] Jan. 7, 1975

[54] PULSE RATE AND AMPLITUDE MONITOR

[76] Inventor: Robert E. Page, 3427 Dumas St., San Diego, Calif. 92106

[22] Filed: Nov. 3, 1972

[21] Appl. No.: 303,560

[52] U.S. Cl. ...... 128/205 T, 128/2.05 P, 128/2.06 E
[51] Int. Cl. ............................................. A61b 5/02
[58] Field of Search ...... 128/2.05 E, 2.05 P, 2.05 R, 128/2.05 T, 2.06 A, 2.06 E, 2.06 F, 2.06 R

[56]  References Cited
UNITED STATES PATENTS

| | | | |
|---|---|---|---|
| 3,228,391 | 1/1966 | Fitler et al. | 128/2.05 T |
| 3,556,084 | 1/1971 | Budde | 128/2.05 P |
| 3,572,322 | 3/1971 | Wade | 128/2.06 E |
| 3,599,628 | 8/1971 | Abbenante et al. | 128/2.06 F |
| 3,608,545 | 9/1971 | Novack et al. | 128/2.06 F |
| 3,646,931 | 3/1972 | Phelps et al. | 128/2.05 P |
| 3,661,147 | 5/1972 | Mason et al. | 128/2.05 T |
| 3,717,140 | 2/1973 | Greenwood | 128/2.05 T |

FOREIGN PATENTS OR APPLICATIONS

| 845,379 | 7/1952 | Germany | 128/2.05 |
|---|---|---|---|

Primary Examiner—William E. Kamm
Attorney, Agent, or Firm—Richard S. Sciascia; Ervin F. Johnston; William T. Skeer

[57] ABSTRACT

A pulse rate meter uses a photo optical monitoring system to obtain analog signals corresponding to the heartbeat of the patient. Suitable amplification and detection circuitry provide an audible tone corresponding to each pulse beat and a visual indication thereof as well as a digital read out of the pulse rate of the patient. Additionally, an auxillary input may provide the indication of the patient's pulse at a separate point from that at which the first pulse was taken. The invention also provides for digital readout of the time difference of pulse detections in the separate channels. Provision is also made for obtaining an electrocardiograph output.

10 Claims, 20 Drawing Figures

Patented Jan. 7, 1975 3,858,574

$$PR = \frac{60}{T}$$

PULSE RATE AND AMPLITUDE MONITOR

STATEMENT OF GOVERNMENT INTEREST

The invention described herein may be manufactured and used by or for the Government of the United States of America for governmental purposes without the payment of any royalties thereon or therefor.

1. Field of the Invention

The invention pertains to the field of instrumentation. By way of further explanation, the invention pertains to the field of biomedicine. In still greater particularity, this invention pertains to electronic instrumentation of cardiovascular condition in a living subject. This invention is further characterized by its pertinency to instrumentation providing a simultaneous indication of a plurality of biomedical conditions. By way of further explanation, but without limitation thereto, the invention pertains to an instrument which provides the digital read out of the pulse rate of a living animal together with an audible indication thereof. Further, the invention pertains to an instrument which will read the pulse rate at a plurality of spaced points on a living organism and provide an indication of the pulse rate as well as the time difference of the pulse at the two spaced points. The invention also provides a visual indication of the relative pulse strengths at the plurality of spaced points and an alarm signal if the pulse rate at either point varies from a predetermined value.

2. Description of the Prior Art

In modern times great advances have been made in biomedical instrumentation. Particularly, instrumentation pertaining to the circulatory system of living animals. Such information is of vital concern in diagnosis of abnormal conditions as well as the determination of normal conditions in a variety of animals including humans.

Traditionally, a physician or biological research worker has listened to the audible pulses produced by the heart of a living organism by a mechanical coupling of his acoustic senses to the body cavity of the subject. Acoustic devices, called stethoscopes, which facilitated this listening form the basis of the historical development of cardiovascular instrumentation arts. As the field of electronics became more wide spread attempts to substitute electrical pick-ups of this audible energy and its amplification to a usable signal became commonplace. Soon, this technique was employed to provide other indications of the cardiovascular condition by incorporating such devices with other instrumentation in the field. One example of such electronic amplification is shown by U.S. Pat. No. 3,651,798 for "Blood Pressure Indicator and Noise" issued to Paul H. Egli et al. on Mar. 28, 1972.

It is also known in the biomedical instrumentation arts to use the photoelectric response of a photocell positioned to intercept a light beam passing through a narrow portion of the human body as a detector. One such device is shown by U.S. Pat. No. 3,628,525 for "Blood Oxygenation and Pulse Rate Monitoring Apparatus" issued to Michael L. Polanyi on Dec. 22, 1971 in which the ear lobe of a patient is monitored to indicate the amount of oxygen in the bloodstream of a subject.

These systems, described above, and others are examples of a large fund of clinical instrumentation knowledge. In general, however, only little inroads have been made in the more ordinary doctor-patient or researcher-subject relationship. In general, these more ordinary situations are still monitored by conventional stethoscope and chronometer method.

The traditional method of obtaining pulse strength and rate information leaves something to be desired in both the time required to perform it and the normalacy of the results obtained. That is, the technique requires trained personnel and the results are influenced by psychologically generated stresses caused by the investigation itself. Thus, for a long time, there has been a need for an instrument which would provide a plurality of cardiovascular indices without disturbing the patient or subject and which would require a minimum of expenditure of time by trained personnel.

SUMMARY OF THE INVENTION

The invention provides a pulse rate meter which provides an instantaneous read out of the pulse rate of the subject and which has a minimum of interference with the subject itself. In particular, a photo-electric pick-up provides an electrical analog of the blood flow of a patient which is converted to digital information indicating the pulse rate and flow rate between preselected areas. Additionally, provision is made for an audible alarm when the pulse rate of the subject changes beyond predetermined parameters.

STATEMENT OF THE OBJECTS OF INVENTION

It is a primary object of this invention to provide an improved cardiovascular instrumentation system.

Another object of the present invention is to provide improved pulse rate meter.

Yet another object of the present invention is to provide a pulse rate meter having a digital read out.

Still another object of the present invention is to provide a pulse rate meter having a very fast response time.

Yet another object of the present invention is to provide a pulse rate meter having a photoelectric input.

Another object of the present invention is to provide biomedical instrument system to simultaneously monitor the blood flow of a subject between two spaced points thereon.

These and other objects of the invention will become more readily apparent from the ensuing specification when taken with the drawings.

DESCRIPTION OF THE PREFERRED EMBODIMENT

Figures 1, 2, 7:
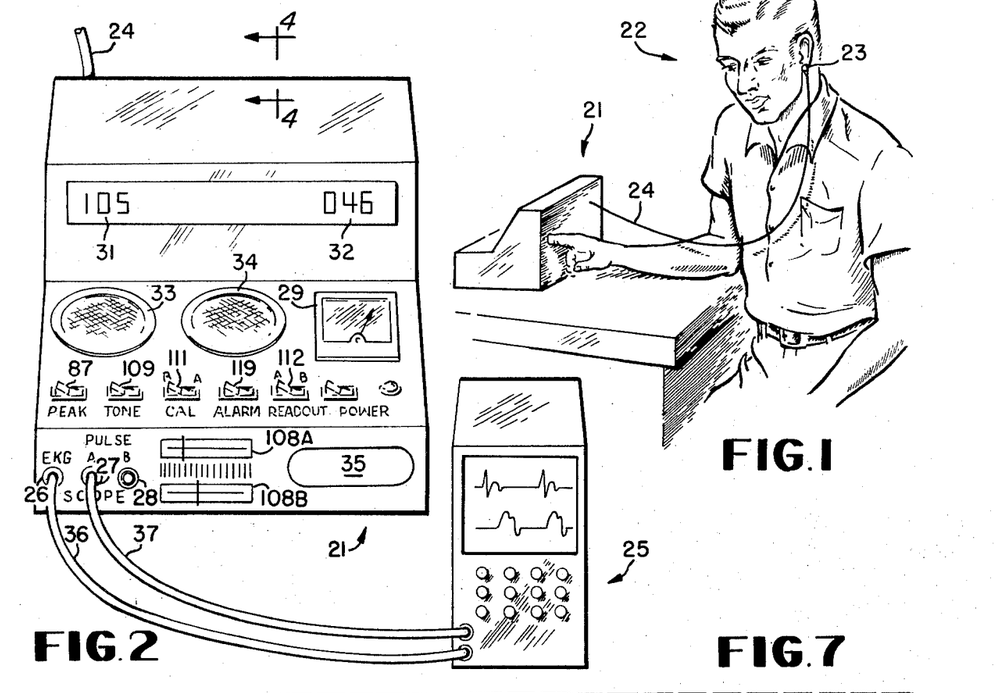
FIG. 1 is a perspective view showing the invention in use.
FIG. 2 is a front elevational view showing the device of the invention in use with an auxillary oscilloscope.
FIG. 7 is a diagramatic showing of the alarm circuit of FIG. 3.

Referring to FIG. 1, the cardiovascular monitor 21 of the invention is illustrated as it would appear when being used by a patient 22 who is seated nearby. As shown, patient 22 inserts a finger in an aperture provided in the back wall of monitor 21, and, additionally, has an ear pick-up 23 connected to monitor 21 by means of a suitable electrical connector 24. There are no other connections to monitor 21 required.

Referring to FIG. 2, a more detailed front perspective view of monitor 21 is shown as it would appear in operation. Monitor 21 is illustrated as it is used in conjunction with a dual trace oscilloscope, indicated at 25. This cooperative use is facilitated by three connectors on the front of the surface of monitor 21 and indicated at 26, 27 and 28. The meter 29 is also positioned on the front panel of monitor 21 and indicates by the extent of its deflection, the relative magnitude of the pulse of the patient 22. A digital readout 31 displays a time related function of the pulse of patient 22 at either time between pulses or pulses per minute. To the right, a second digital readout 32 indicates the delay between the two pulse positions in milliseconds. Thus, in the illustrated arrangement the patient is seen to have a pulse rate of 105 beats per minute and a delay between the two sampling areas, in the illustrated case the ear and the finger, of 46 milliseconds. A speaker 33 is located on the front panel of monitor 21 and provides an audible beat note for each pulse, if desired.

A second speaker 34, located on the front panel of monitor 21, adjacent to speaker 33, provides an audible alarm for abnormal conditions of the pulse of patient 22, when desired. A hinged front panel 35 conceals additional controls not located on the front panel. The remaining switches and controls illustrated and enumerated in FIG. 2 will be described in connection with the circuit description of the various component circuits.

In the illustrated arrangement, oscilloscope 25 is connected by conductor 36 to the EKG output of monitor 21 and by the conductor 37 to connector 27, the pulse A channel output. Thus, on scope 25 are displayed the electrocardiogram signal on the upper trace and the pulse beat of patient 22 on the lower trace. Of course, the delay between the corresponding pulses is an indication of the delay between the operation of the heart and the arrival of the pulse. This time delay is useful as a diagnostic indication and may be read on the scope face.

Figure 3:
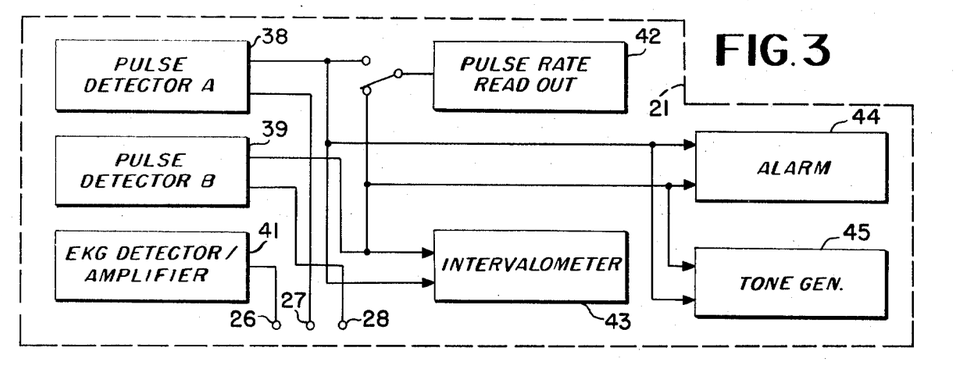
FIG. 3 is a block diagram showing how the various circuits of the invention are interfaced.

Referring to FIG. 3, a diagramatic representation of the major component circuits obtained in monitor 21 is illustrated. As shown the device comprises a first pulse detector 38 and a second pulse detector 39. For purposes of descriptive clarity the various pulse detectors will be referred to as A and B and correspond to either the internal finger monitor or the external monitor channel, illustrated with ear pick up 23 in FIG. 1. Because of the attachment to the patient at spaced points of the two channels, A and B, it is convenient to also include within monitor 21 an EKG detector amplifier. This circuit is indicated at 41.

A pulse rate readout channel 42 is switchably connected to either pulse detector 38 or pulse detector 39, as desired.

Also shown is a conventional digital readout intervalometer 43 which is connected to receive the outputs from pulse indicators 38 and 39. Of course, if desired, intervalometer 43 may also be connected to EKG detector amplifier 41 rather than one on the pulse rate detectors 38 or 39. Such an alteration of the illustrated arrangement would be an obvious modification to one versed in the art if it is desired to read this interval directly on the digital readout 32, FIG. 2, rather than from oscilloscope 25.

An alarm circuit 44 is also a component part of monitor 23 and may be programmed to provide an audible indication when the pulse rate of patient 22 exceeds or drops below a predetermined value. Of course, if desired, a visual signal may be used in conjunction with or in place of the audio signal.

Similarly, a tone generator 45 is connected to receive the output of pulse detector 38 and the pulse detector 39 to produce an audible signal in response thereto. If desired, tone generator 45 may produce a different audible tone for the pulses detected by pulse detector 38 than those detected by pulse detector 39. Ordinarily, however, such a refinement is unnecessary for diagnostic purposes and, in fact, in most instances a single tone is preferred when an audible indication of the pulse rate is desired.

Figures 4A, 4B, 5:
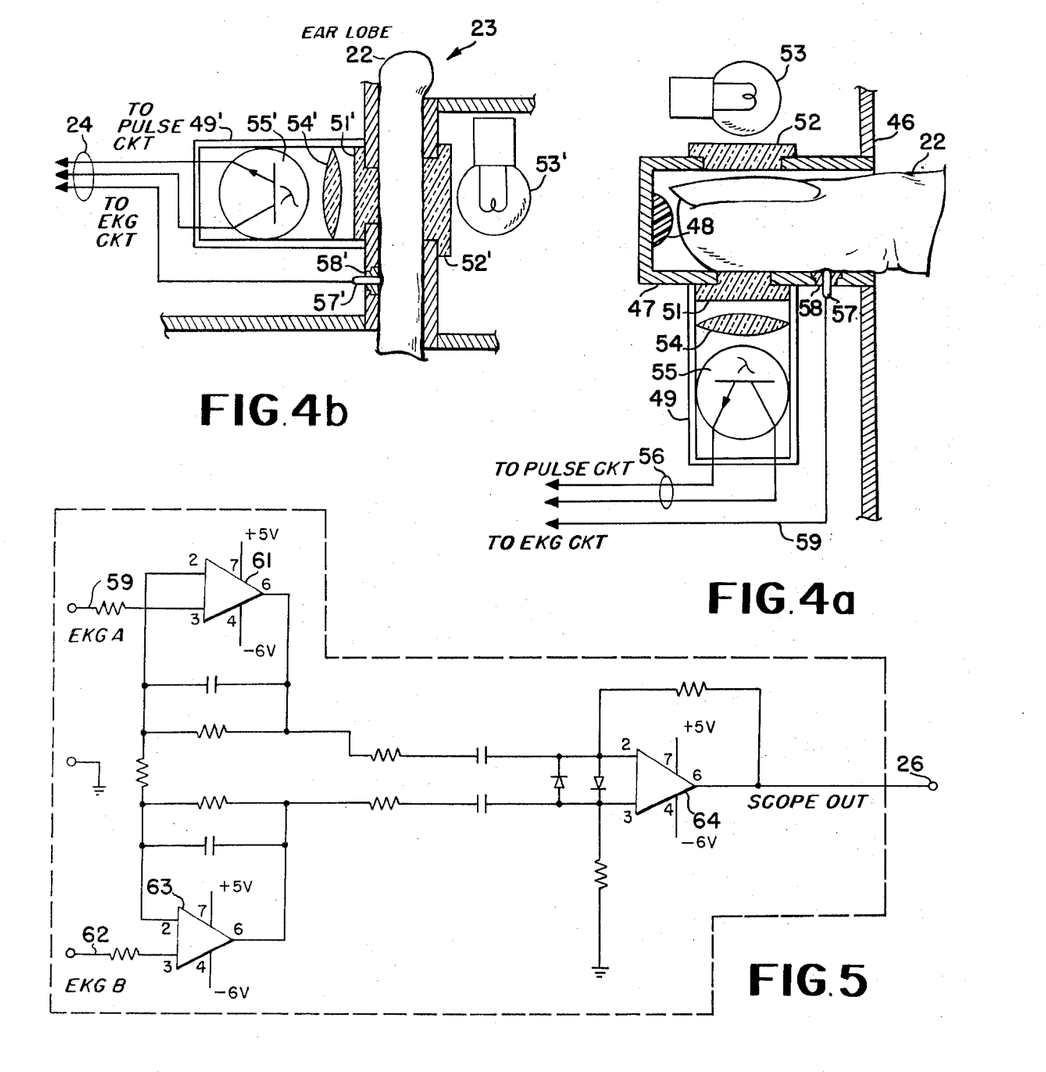
FIG. 4a is a partial sectional view taken along the line 4—4 of FIG. 2.
FIG. 4b is a sectional view of an ear lobe pick up arrangement.
FIG. 5 is a diagramatic showing of the EKG detector amplifier of FIG. 3.

Referring to FIG. 4a, the internal photoelectric detector will be described. As shown, the cabinet 46 of monitor 21 is apertured to receive the finger of patient 22. A receptacle 47 is supported by cabinet 46 and extends inwardly to receive finger of subject 22.

A soft rubber pad 48 is mounted on the innermost wall of receptacle 47. Pad 48 is used as an index for the patient 22 to press his finger against. In this manner, the finger is assured to be over the optical housing 49 which extends from one side of receptacle 47.

Housing 49 is placed over a light path through receptacle 47 which is closed by suitable transparent windows 51 and 52. A light source, indicated by bulb 53, is positioned above window 52 so as to shine light through the passage closed by windows 52 and 51, into housing 49. A suitable optical system, such as a lens 54, focuses a light from lamp 53 onto the photoelectric surface of a photo semiconductor 55. Photosemiconductor 55 is connected by means of suitable conductor 56 to the remainder of pulse detector 38.

An EKG pickup is provided by a contact 57 which is supported in an insulated portion of receptacle 47 as indicated at 58.

Electrical connection to contact 57 is provided by means of a suitable electrical conductor 59. A second photoelectric pickup, similar to that shown in FIG. 4a, may be provided, if desired. However, for purposes of completeness, it should be noted that the photoelectric pickup shown in U.S. Pat. No. 3,628,525 issued on Dec. 21, 1971 to Michael L. Polanyi for "Blood Oxygenation and Pulse Rate Monitoring Apparatus" may be used with suitable modifications, if desired. In addition to providing an EKG electrode, such modifications would include, for example, the adjustment of the clamping pressure such as to not interfere with the normal pulse rate of patient 22.

Referring to FIG. 4b, such as an ear pick up arrangement is illustrated without the biasing arrangement which, as discussed above, may be the same as that shown in the Polanyi patent. In the illustration the same reference numerals with the addition of prime notations are applied to the similar structure illustrated in FIG. 4a. The signal output from photo semiconductor 55 and EKG contact 57' are transmitted via conductor 24 as described in connection with FIG. 1.

Referring to FIG. 5, the details of EKG detector amplifier circuit 41 will be described. Conductor 59 transmits the electrical signal from contact 57 to an input of integrated amplifier module 61. Similarly, a conductor 62 from the other EKG contact carries a similar signal to an identical integrated amplifier module shown at 63. A conventional electrode which provides the third connection for EKG reading is shown as a signal ground. Modules 61 and 63 are connected by the resistance and capacity network illustrated to a third integrated amplifier module 64 which amplifies the signals and produces a linearly amplified output signal which is fed to output terminal 26. The illustrated circuit employs all type 741 integrated amplifier modules and provides adequate output voltage to provide an EKG reading and display on conventional readout oscilloscopes. Of course, the EKG detector amplifier 41 is not an essential part of the pulse reading system of the invention but may be incorporated with such a small additional cost that its presence is justified, especially when oscilloscope 25 is used in conjunction with monitor 21. As will be recognized by those versed in the electronics arts, other amplification modules may be used with appropriate circuit changes to produce the desired amplified EKG signals.

Figure 6:
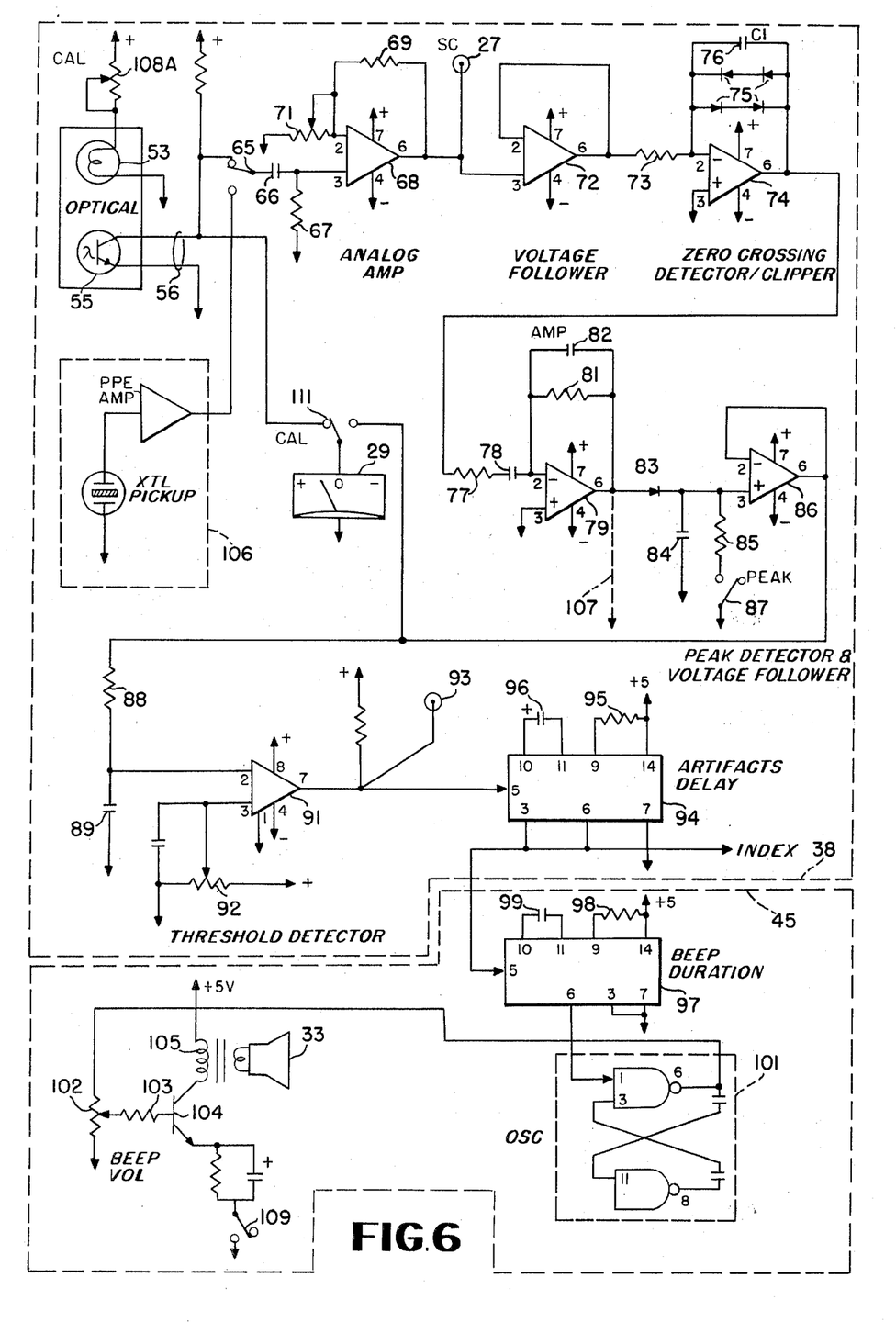
FIG. 6 is a diagramatic showing of the pulse detector circuit of FIG. 3 and the tone circuit of FIG. 3.

Referring to FIG. 6, the circuit details of pulse detector 38 will be described. It should be noted at the outset, pulse detector circuit 39 is identical with pulse detector circuit 38 and, therefore, only circuit 38 will be described in detail. Pulse detector circuit 39 will be understood to occupy the place in the system indicated in FIG. 3 and is identified as channel B in the drawings.

As shown, the signal from the photocell 55 is fed, via conductor pair 56 and switch 65 to coupling capacitor 66 which, in conjunction with resistor 67, couples the signal to amplifier module 68. Amplifier module 68 is controlled in gain by a feedback network comprising resistor 69 and potentiometer 71. Potentiometer 71 is connected as a variable resistance and forms a divider with resistor 69. The control for potentiometer 71, which may be of a screwdriver type, is located behind panel 35 and therefore does not appear on the face of the monitor 21 as illustrated in FIG. 2.

The output of amplifier module 68 is coupled directly to the appropriate scope output connector 27 and to amplifier module 72. Amplifier modules 72 is connected as a voltage follower. In this configuration, amplifier 72 serves as an impedance matching device having a high input impedance and a relatively low output impedance. The output of module 72 is resistence coupled to an amplifier module 74 by means of resistor 73.

Amplifier module 74 is a relatively high gain circuit and amplifies the incoming analog signal by a factor of 10,000. It will be observed that amplifier module 74 has a feedback arrangement comprising of a plurality of diodes 75 and a capacitor 76. The diodes are chosen to limit the output voltage of amplifier 74 to approximately a plus or minus 1.4 volts. This level has no effect on the signal level but will prevent overload of the circuit by large magnitude signals which may be caused by large artifacts such as the initial insertion of the finger of patient 22, for example. This voltage limitation permits a much faster recovery time for amplifier 74 than would be possible without their use. Capacitor 76 is chosen to have a value to limit the high-frequency noise and spikes that may be present in the signal.

The amplified output signal from amplifier module 74 is coupled, via resistor 77 and capacitor 78, to another amplifier module 79. Amplifier 79 has its gain and frequency response controlled by the feedback network comprising resistor 81 and capacitor 82. This stage has a medium gain of approximately 100 and provides a well shaped pulse output which is processed to obtain the index signal output from pulse detector ckt 38.

The pulse output of amplifier module 79 is coupled to a series diode 83 which allows only the positive going portion of the output signal to be coupled to amplifier module 86 which, like modules 74 and 79, may be a type 741. A coupling network comprising resistor 85 and capacitor 84 provides for peak reading of each pulse by meter 29 when switch 87 is closed such that the relative magnitude of the pulse signals is visually indicated.

Amplifier module 86 is connected as a voltage follower and is coupled via switch 111 to a meter 29. Also, the output of module 86, referred to as a digital index signal, is fed, via resistor 88 and capacitor 89, to a solid state module 91 which may be a type 311 and is connected as a threshold detector and amplifier. The threshold response of module 91 is controlled by a potentiometer 22 and capacitor connected in circuit therewith. Like potentiometer 71, potentiometer 92 has its operational control concealed behind panel 35. The output of module 91 is directly coupled to an output connector 93 which may provide a scope output trigger where desired. This connector is also concealed behind panel 35.

The output of module 91 is also directly coupled to an integrated module 94 which is connected as a monostable multivibrator and serves, in the pulse monitor of the invention, as an artifact delay. The delay interval is, of course, controlled by the external resistance 95 and capacitance 96 connected in circuit thereto. Module 96 is type 74121 integrated circuit.

As will be apparent to those versed in the medical instrumentation arts, an artifact delay in such circuits is necessary to prevent the pulse monitor 21 from reacting to involuntary movements of a small magnitude caused by patient 22. Such movement, termed an artifact, may be registered as a pulse beat if such a delay were not present.

The processed output of pulse detector 38 is indicated as the index output in the drawings and the signal representing this processed pulse information is termed the index signal in the description of the invention.

It is sometimes desirable to have an audible tone to accompany each pulse beat monitored by the pulse monitor 21 and such a tone is provided by means of a tone generator circuit 45, also illustrated in FIG. 6. As illustrated, the index signal is directly coupled to a solid state module 97 also a type 74121 integrated circuit. Module 97 is connected as a monostable multivibrator having its frequency of operation determined by external resistance 98 and external capacitance 97. The output of this multivibrator, in turn, triggers or keys an oscillator circuit as represented by solid state module 101, a type MC 823P circuit. Of course, any audio oscillator having the designed tonal frequency may be employed in the invention. However, for purposes of completeness and clarity it will be noted that an audio frequency free running multivibrator type oscillator is illustrated. A number of solid state modules of other types than that specified are available to provide this type of operation and may be employed, if desired.

The keyed output of oscillator module 101 is coupled to a potentiometer 102 which serves as a beep volume control. This potentiometer has its operational control concealed behind panel 35, FIG. 2. Potentiometer 102 is resistance coupled by means of resistor 103 to the base element of a transistor 104 which may be, for example, a 2N2222. Transistor 104 serves as an audio amplifier. A transformer 105 in the collector circuit of transistor amplifier 104 couples and impedance matches the amplified audio signal to the speaker 33. Of course, as will be apparent from the diagram, the operation of audio amplifier transistor 104 is controlled by switch 109 in the emitter circuit thereof. When switch 109 is in the illustrated open position no audio tone is heard.

At this point, minor circuit modifications to the circuit illustrated in FIG. 6 which have proved useful in the device of the invention should be discussed. As shown, an additional pickup 106 may be employed in lieu of the foredescribed optical pickup. Such a pickup may employ an amplified crystal microphone signal and be coupled directly into amplifier module 68 by means of switch 65. In one convenient arrangement switch 65 comprises a jack operated switch that is operated upon the insertion of the crystal microphone pickup connector into a socket provided on either the rear surface of monitor 21 or in the area behind panel 35.

If desired, the peak voltage detector and voltage follower comprised by integrated module 96 and the associated coupling circuitry may be dispensed with and the output of module 79 directly coupled to meter 29 and module 91 by means of suitable circuit connections. This simplification is considered desirable in some models of the device for cost effectiveness where the relative peak intensity of the individual pulses is not needed.

When switch 111 is placed in the calibrate position, indicated in the figure, the intensity of the light source 53 may be controlled by a potentiometer 108A. Of course, a similar potentiometer 108B is used to control light intensity in the auxilary or B channel output. Because of its small size, low cost, and portability the pulse monitor 21 may be used as a bedside monitor or in an operation ampitheatre as a monitor of the pulse of the patient. In this use, pulse monitor 21 frees the time of a trained person as well as physically removing another person from attendence of patient 22. For such applications pulse monitor 21 is provided with an audible alarm to alert attending medical personnel should the pulse of patient stop. This function is performed by alarm circuit 44.

Referring to FIG. 7, it will be seen that the index signal is applied to an integrated solid state module 113 which is wired as a bistable multivibrator and may be a type 7474 integrated circuit. Each index pulse, then, toggles the bistable multivibrator to its opposite conducting condition.

Figure 8:
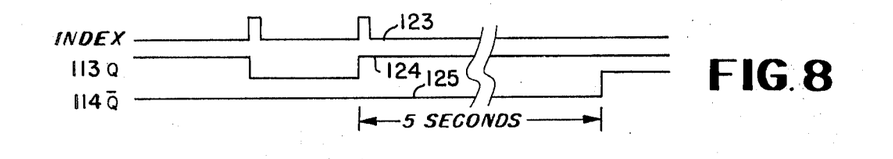
FIG. 8 is a chart showing the wave forms present at selected points in the circuit diagram of FIG. 7.

Referring to FIG. 8, the timing chart for the operation of alarm circuit 44 is illustrated to show this condition. Thus, the train of index pulses, illustrated by curve 123, corresponds to the square-wave pulse represented by curve 124 which is the output of bistable multivibrator circuit including integrated solid state module 113.

This square wave output is applied directly to a solid state module 114 which is a type 74121 integrated circuit wired to function as a monostable multivibrator. The time of relaxation of the monostable multivibrator module 114 is determined by potentiometer 115 and the capacitance 116 wired in circuit therewith. In the device of the invention, the value of the potentiometer 115 and the capacitor 116 are chosen to permit operational delays of approximately five seconds. Of course, this delay is adjustable over a finite range by positioning the control potentiometer 115. The mechanical access to permit this setting may be conveniently had behind panel 35, FIG. 2.

Rather than use the output of the signal to key an audio oscillator directly as was done in tone generator 45, the output of module 114 is applied to a logic circuit contained within a type 7400 integrated circuit module 118, the other input is coupled to a suitable audio oscillator 117 which, like audio oscillator 101 may comprise a multivibrator integrated circuit type MC832P. The circuit of module 118 is wired such that the positive going pulse from monostable multivibrator 114 permits the passage of the audio tone. The second stage of integrated circuit module 118 is also a logic coincidence circuit which has the second input tied to switch 119. When switch 119 is in the closed position, the audio alarm signal is coupled to the base of an audio amplifier comprising transistor 121. A suitable audio transformer 122 in the collector circuit of transistor 121, which may be a type 2N2222, provides impedance matching and coupling to a speaker 34.

Thus, it may be seen that when no index signal is received within a 5-second interval, an audible tone generated by audio-oscillator 117 is radiated by speaker 34. As previously indicated, speaker 34 may be located at a remote position with respect to patient 22, such remote alarms are, of course, known in the biomedical arts and, therefore, the advantages and constructional details thereof need not be explained here for the understanding of the invention. Likewise a visual alarm such as a light, not shown, may be controlled by transistor 121, if desired.

As may be seen, the index signal is a digital pulse signal in which each pulse corresponds to a pulse beat of patient 22. In order to provide a readout of this information, further signal processing is required. In a simplified form, the period of the pulse would be indicative of the pulse rate. The processing of the digital signal to obtain a pulse interval is a rather straight forward data processing problem. An example of one circuit which provides a solution to this problem is illustrated at FIG. 9.

Figure 9:
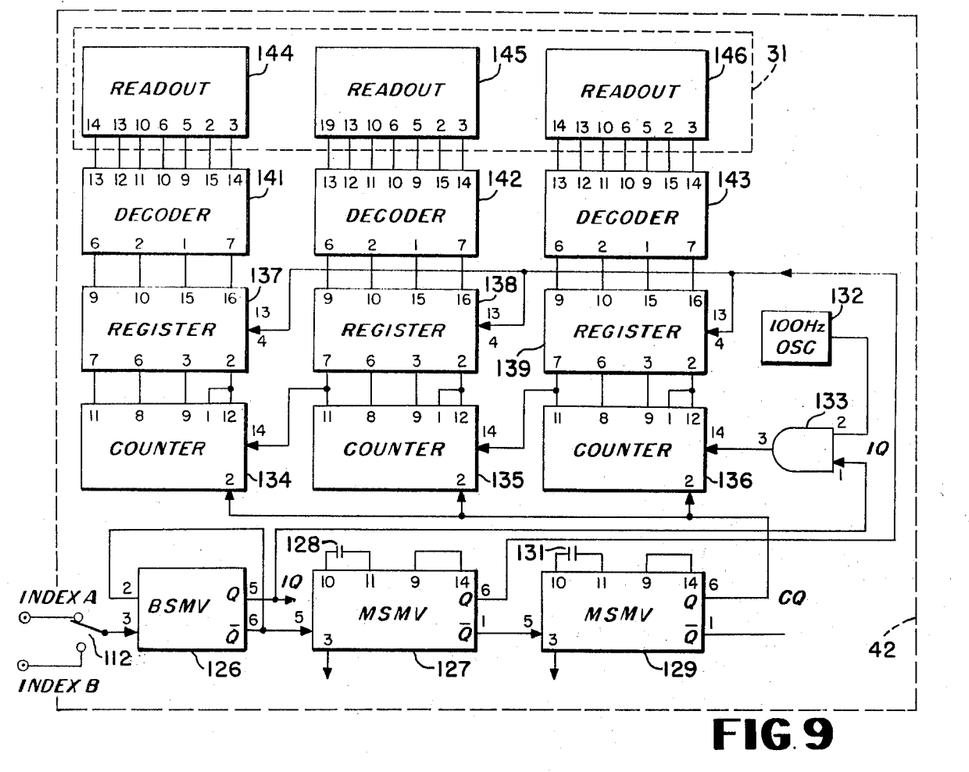
FIG. 9 is a diagramatic showing of one form of read out circuit employed by the invention.

Referring to FIG. 9, a circuit which will read the period of the pulse beat of patient 22 will be described. The index signal from either pulse rate detector 38 or 39 is coupled to a type 7474 integrated circuit module 126 by means of switch 112, circuit module 126 is wired as a bi-stable multivibrator and its conduction state with each index pulse received. The $\overline{Q}$ output is connected to a circuit module 127.

Circuit module 127 is a conventional integrated circuit assembly such as a type 74121, for example, which is connected as a monostable vibrator. The time of relaxation controls the pulse width of the output and is determined by the external connected capacitor 128.

Similarly, the $\overline{Q}$ output of circuit module 127 is connected as an input signal to an integrated circuit module 129 which is also wired as a monostable multivibrator having an external capacitor 131 to regulate the pulse width thereof.

The Q output of bi-stable multivibrator formed by circuit module 126 is connected to a logic gate 133 which also receives an input from a frequency standard such as 100 Hz oscillator 132. Thus it may be seen that the output of 133 is a series of pulses from oscillator 132 the duration which is determined by the output of bi-stable multivibrator module 126. Since bi-stable multivibrator circuit module 126 is keyed by the index signal, it will be readily seen that the output of gate 133 will be a a period of pulses having a constant frequency. These pulses are connected to a conventional series of counters represented by circuit module 134, 135, and 136. Counters 134, 135, and 136, which may be type 7490 integrated circuits, are connected respectively to suitable register circuit modules 137, 138 and 139, such as type 7475 integrated circuits. Thus, the register modules 137, 138 and 139 store the count on counters 134, 135 and 136. Also, the Q output of monostable multivibrator circuit module 127 is connected to register circuit modules 137, 138 and 139 where it serves as a clear or reset pulse.

In a similar fashion, the Q output of monostable multivibrator circuit module 129 and connected to counter circuit modules 134, 135 and 136 and serve as a clear signal for each of the counters.

Registers 137, 138 and 139 are connected to conventional decoder modules 141, 142 and 143 which decode the binary information stored in circuit modules 137, 138 and 139 such that it may activate a conventional seven segment readout lamp connected to it. As shown, the seven segment readout lamps 144, 145 and 146 comprise the previously described digital readout 31.

Figure 10:
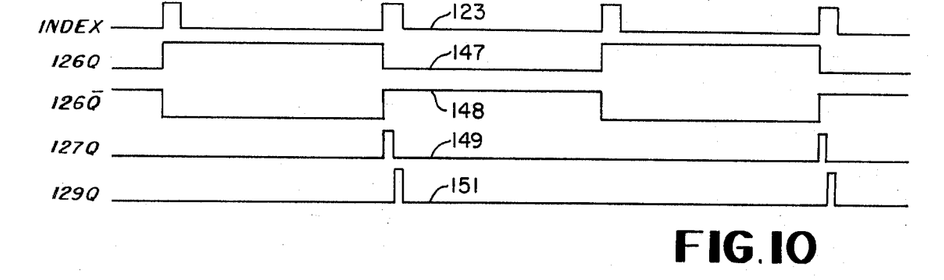
FIG. 10 is a chart showing wave forms present at selected points on the readout circuit of FIG. 9.

Referring to FIG. 10, the pulse timing chart corresponding to the aforedescribed circuit operation will be described. As shown, curve 123 corresponds to the index pulses supplied the digital readout circuit by pulse detector 38. The Q output of circuit module 126 is represented by curve 147 and, as shown, comprises a square wave having a pulse duration corresponding to the pulse interval between the index pulses of curve 123. As previously described, this signal serves as a control signal for gate 133 to gate timing oscillator 132.

The $\overline{Q}$ output of bi-stable multivibrator circuit module 126 is shown by curve 148 and is a similar wave shape to that of curve 147 but of the opposite-going sign. As previously described, this signal is connected to a monostable multivibrator 127 and positive going portion thereof provides a trigger signal for that circuit.

The Q output of monostable multivibrator circuit module 127 is illustrated by curve 149. This curve represents a signal in a series of positive square wave pulses corresponding in time to every other pulse of signal 123. This signal is supplied to register circuit modules 137, 138 and 139 and serves to clear the stored signals prior to the next pulse count.

Curve 151 corresponds to the Q output signal of circuit module 129 which, as previously described, is connected as a monostable multivibrator and is similar in appearance to the output wave form of circuit 127. However, it will be noticed that the timing of the pulses comprising the Q output of monostable multivibrator 129 are delayed for one pulse width of the output of monostable multivibrator 127. This delayed signal serves as a clear signal for the counters 134, 135, and 136.

As may be seen from the wave shapes of FIG. 10, the pulse width of curves 149 and 151 are one half that of the index pulse represented by curve 123. Since curve 151 represents a clear signal for counter modules 134, 135 and 136 it will be apparent that the counters are cleared such as to count the number of cycles of oscillator 132 appearing in the interval between pulses of the index signal. Therefore, it may be seen that a critical relationship exists between the value of capacitors 128 and 131 and the circuit components of FIG. 6 determining width of the individual index pulse spikes.

As previously noted, the output of the circuit of FIG. 9 corresponds to a digital readout of a period between pulse beats of subject 21. However, to be readily understood by medical persons who, for historical reasons, have been trained to monitor pulses as a rate, a conversion between the pulse interval and the pulse rate must be made. Of course, this may be done by means of charts or a simple calculator, however, it would be considerably more convenient if readout 31 displayed the pulse rate of patient 22 directly. This operation may be done automatically by pulse monitor 21 by means of circuitry which would solve the equation: pulses-per-minute = 60/period between pulses. Two circuits which perform the operation will now be described.

Figure 11:
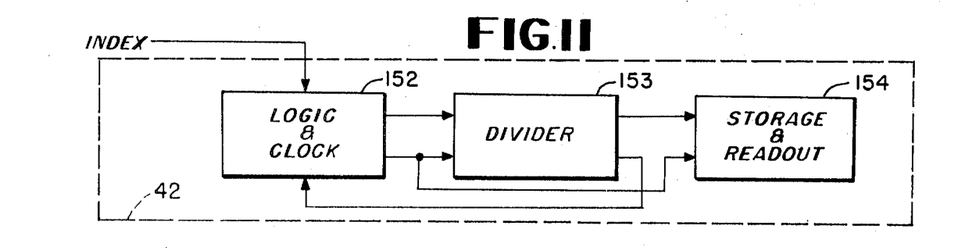
FIG. 11 is a block diagram of an alternate readout circuit which may be used with the invention.

Referring to FIG. 11, the first circuit providing a direct readout in pulses-per-minute is illustrated with each major component comprising a single box in the diagram. As shown, a logic and clock circuit 152 receives the index pulses from the pulse detector circuit, previously described. This circuit is connected to a divider circuit 153 and supplied both logic control pulses and control signals developed from the index pulses by logic circuit 152. Divider circuit 153 is connected to a storage and readout circuit 154. The divider circuit 153 supplies storage and readout circuit 154 with accumulator pulses, as will be described. It will also be noted that divider 153 is connected to logic and clock circuit 152 to provide a feedback signal corresponding to the division operation performed by this circuit. Storage and readout circuit 154 is also connected to logic and clock circuit 152 and receives control signals therefrom to program the storage transfer and readout of the accumulator count provided by divider 153.

Figure 12:
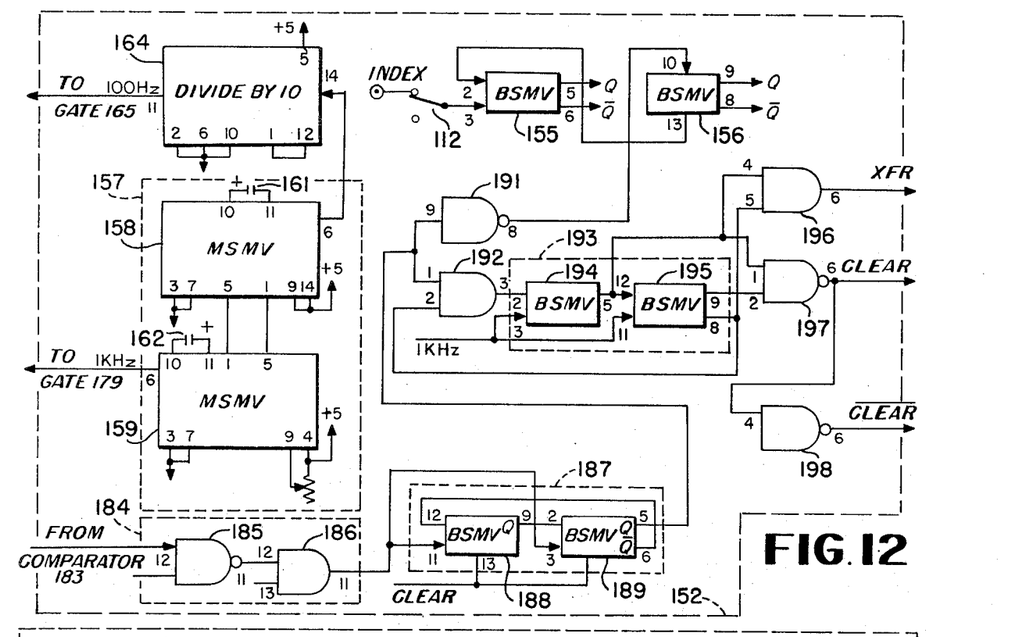
FIG. 12 is a diagramatic showing of a logic and clock circuit of FIG. 11.
Figure 13:
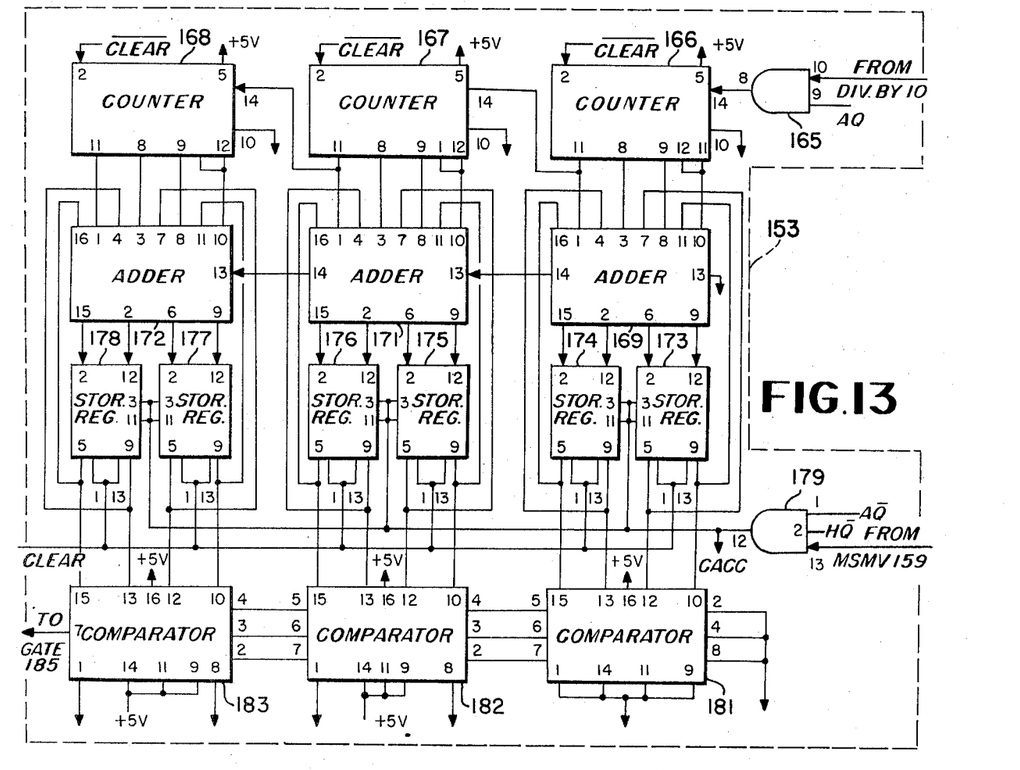
FIG. 13 is a diagramatic showing of the divider circuit of FIG. 11.
Figure 14:
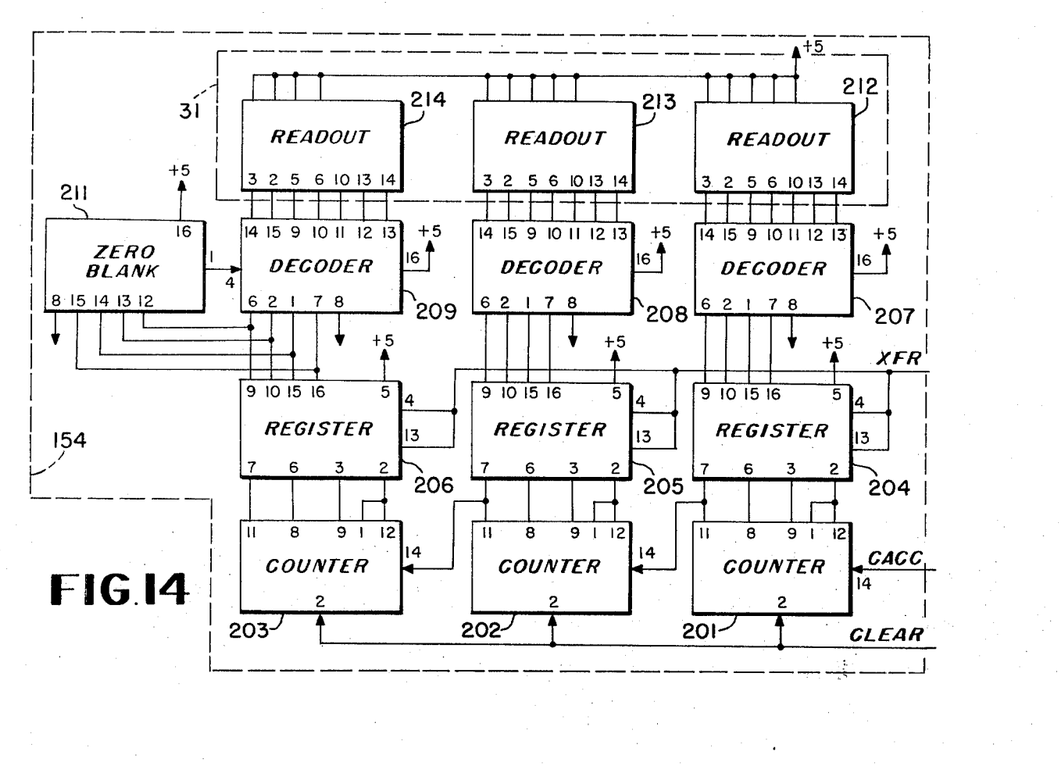
FIG. 14 is a diagramatic showing of a storage and readout circuit of FIG. 11.

The operation of the individual circuits illustrated in FIG. 11 will be more clearly understood with reference to the accompanying FIGS. 12, 13 and 14 which illustrate, respectively, a block diagramatic showing of each of the major circuits shown in FIG. 11.

Referring to FIG. 12, it will be noted that the index signal from one of the pulse detectors circuits 38 or 39 is coupled to a bi-stable multivibrator 155 by means of switch 112. A second bi-stable multivibrator 156 is connected to bi-stable multivibrator 155 and receives inputs from the $\overline{Q}$ output therefrom. Bi-stable multivibrators 155 and 156 generate gating control pulses in response to every other index pulse in a similar fashion to bi-stable multivibrator 126, previously described in a connection with FIG. 9. The precise fashion in which the gate signal outputs from these bi-stable multivibrators are employed with remainder of the circuitry will become more apparent as the description of FIG. 13 and 14 continue.

A clock circuit 157 is also included in logic and clock circuit 152. Clock 157 comprises two monostable multivibrators 158 and 159 connected back-to-back. The frequency characteristics of monostable multivibrators 158 and 159 are controlled by external capacitors 161 and 162 together with potentiometer 163 to provide a very stable 1 KHz output clock signal.

A divide-by-ten circuit 164 is connected to clock circuit 157 to receive an output therefrom and to divide the output by a factor of 10 to produce a 100 Hz output signal to be used as a clock signal for the counter circuit. A second 1 KHz signal is connected to the counter circuit to be used as a control signal as will be described in connection with FIG. 13.

The remaining portions of logic and clock circuit 152 receive input signals from divider circuit 153 and, therefore, will be described after the details of divider circuit 153 have been described.

Referring to FIG. 13 the operation of divider circuit 153 will be described with reference to the illustrated block diagram. However, before proceeding with the operational description of the block diagram the over all principles of the divider circuit 153 should be noted. The divider circuit operates by counting the number of clock pulses occurring within a predetermined interval. The count is then added to itself repeatedly until the total exceeds a predetermined value, here a count of 6,000. The number of times that this addition occurs is the number required to satisfy the equation to convert a time period between pulses to pulses-per-minute. For reasons of economy and circuit simplicity, the counters used by circuit 153 have a total count capacity of 2,047. Therefore, the required count of 6,000 will have filled the counters the first time and correspond to a partially loaded counter chain on the subsequent counting sequence.

Referring to FIG. 13 it will be seen that the 100 Hz signal is fed to a gate circuit 165 which is also controlled by the Q output of bi-stable multivibrator 155. Gate 165 is fed to counter circuit 166 which, in turn, is coupled to counter 167, likewise connected to counter 168. As will be obvious to those versed in the art, counters 166, 167, and 168 will count the 100 Hz signal pulses during the interval determined by gate signal 165 Q. Thus it may be seen that the counters will include the pulse count on every other pulse cycle of the index signal.

Each of the counters 166, 167 and 168 are connected to a corresponding adder circuit 169, 171 and 172. Each adder circuit has four output connections made to a pair of storage register circuits associated with each adder circuit. Thus, adder adder 169 is connected to storage register 173 and 174, adder circuit 171 is similarly connected to storage registers 175 and 176, and adder circuit 172 is connected to storage registers 177 and 178. Storage registers 173 through 178 recirculate the input to their associated adder circuits during the intervals when gate 165 is closed. The clocking of the adder circuits to trigger the recirculation is accomplished by means of a gate 179 which is connected to each of the storage registers 173 through 178.

It will be observed that gate 179 gates 1 KHz clocking signals to the respective chain of storage registers during the coincidence of the $\overline{Q}$ output from bi-stable multivibrator 155 and 156.

The outputs of the storage registers are also connected to three comparator circuits 181, 182 and 183. The comparator circuits are wired such as to produce an output signal when the adder circuits reach a total of 6,000. This output signal is coupled to a delay circuit 184, FIG. 12. As previously noted, the adding sequence is stopped when the count approaches that corresponding to the number 6,000 on the second incidence in each timing count cycle.

It will also be noted that a count accumulation signal is taken from the output of gate 179 to be stored and registered as previously described.

Referring again to FIG. 12, it will be observed that the delay circuit 184 is comprised of a pair of gates 185 and 186. The output of delay circuit 184 is connected to a counter circuit 187.

As shown, counter 187 is comprised of two bi-stable multivibrators 188 and 189. Each bi-stable multivibrator 188 and 189 receives a trigger input from delay 184. As will be well understood by those versed in the electronic arts, this configuration results in a counter which counts to two before producing an output signal on the Q terminal of bi-stable multivibrator 189. This circuit then generates an output signal when the divider circuit of FIG. 13 reaches its preloaded comparison level corresponding to 6,000. This output signal is connected to two gate circuits 191 and 192.

Gate circuit 191, in turn, is connected to bi-stable multivibrator 156 and toggles that circuit to produce an output gating signal which, as previously noted, is a control input signal connected to gate 179, FIG. 13.

Gate circuit 192 is connected to a one clock pulse delay circuit 193 which in turn is comprised of bi-stable multivibrators 194 and 195.

Bi-stable multivibrator 194 receives an input from gate 192, previously noted, and the one KHz signal from clock circuit 157. The Q output of bi-stable multivibrator 194 is coupled to a gate circuit 196 which gates the signal to the indicator circuit (to be described with reference to FIG. 14) as a transfer signal, shown as XFR. The Q output of bi-stable multivibrator 194 and the one KHz signal are also supplied as input signals to bistable multivibrator 195. The Q output of multivibrator 195 is fed to the gate circuit 197 which generates an output signal which is a "clear" signal and likewise is coupled to the indicator circuit of FIG. 14.

The output of gate 197 is also connected to a gate 198 which provides a clear signal which is connected to counters 166 and 167 and 168, FIG. 13.

It may be seen that the count accumulation signal, abbreviated CACC, is comprised of a plurality of 1 KHz pulses corresponding to the number of addition cycles required to reach preset value of 6,000. Thus, this count is indicative of the pulses per minute of patient 22.

Referring to FIG. 14, it will be observed that the count accumulation signal is fed to a series of counters 201, 202 and 203. The transfer signal (XFR) is also fed to each of the register circuits 204, 205 and 206. Upon receipt of the transfer signal the register gates are opened and the register records and holds the count then present in counters 201, 202 and 203. On the next pulse the clear signal is fed to each of the counters 201, 202 and 203 and removes the count therefrom preparing them to receive the next series of count accumulation signals.

The plurality of decoder circuits 207, 208 and 209 are each coupled respectively to the register circuits 204, 205 and 206. These decoder circuits translate the decimal count contained in registers 204, 205 and 206 to the appropriate code for the seven segment read out tubes 212, 213 and 214 comprising read out 31.

A zero blank circuit 211 is connected between register 206 and decoder 209 and serves to blank the output of that decoder when the first significant figure on the pulse rate is zero.

All will be appreciated, the foregoing description of the pulse monitor circuits is relatively complex for economic manufacture and assembly. However, such a system will measure accurately, and very quickly, the pulse rate or pulse interval for any particular specimen including animals other than humans. The wide variety of pulse rate for living creatures is well known and varies from the very fast pulse beat of small birds to the relatively slow pulse beat of large terrestrial animals.

If the use of pulse monitor 21 is to be confined to human beings, a considerable simplicity of circuitry is possible because of the limited pulse rate normally encountered. That is, while the circuit arrangement shown in FIG. 11 may be desirable for surgical amphitheaters where pulse rate may fall to a very low ebb indeed, the pulse rate normally encountered in the human beings ranges between 40 as an unusually low rate to 200 an extremely high rate. Using such a limited range, a lower cost and somewhat simplified version of pulse monitor 21 is possible.

Figure 15:
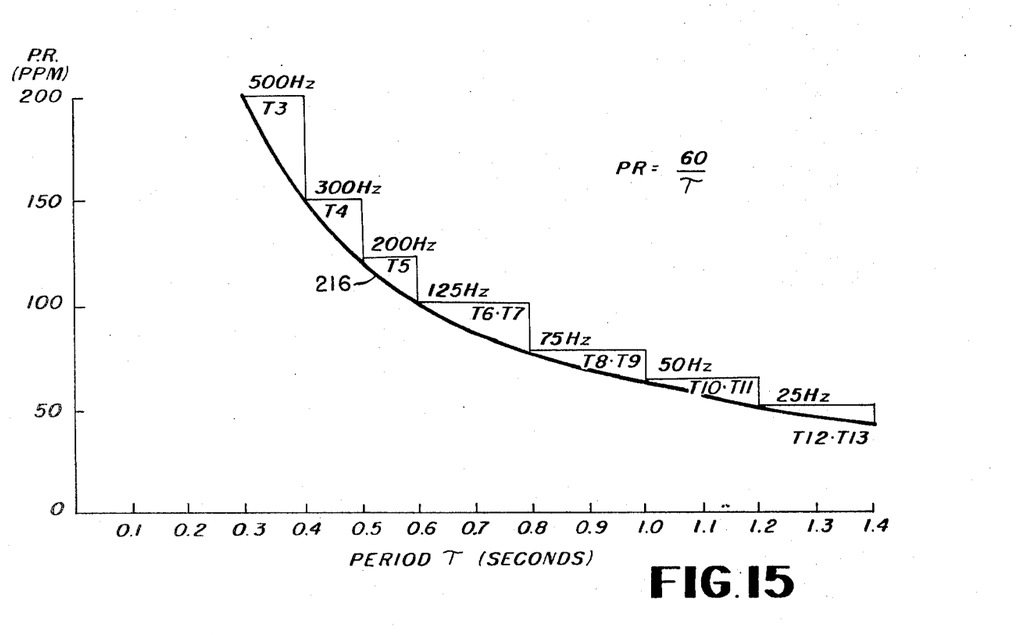
FIG. 15 is a chart showing the relationship between pulse rate and pulse period over the useful range for human subjects.

Referring to FIG. 15, the graph of such a pulse rate range as a function of a period tau between pulses is represented by curve 216. In order to make readout 31 read directly in pulses-per-minute it has been determined that is is advantageous to preload the counter with a rate corresponding to the highest anticipated pulse rate, in this case 200 pulses per minute, and count down by a programmable oscillator to approximate curve 216. In order to accomplish this desired programming, the timed intervals shown along the period scale are broken to 100 millisecond intervals. And the clock frequencies necessary to approximate curve 216 for each interval are indicated on the curve in Hertz. Thus, during the interval T-3 corresponding to the time interval of 300 to 400 milliseconds the 500 Hz is required. That is, during the time interval T-3, 50 pulses would be subtracted from the preloaded 200 pulse input to arrive at 150 pulse per minute rate corresponding to the time period of 400 milliseconds between pulses. Similarly, other frequencies are shown along curve 216 and the corresponding time interval has a function of 100 millisecond periods after the initial pulse is shown on the graph. It will be noted, that as the pulse rate curve 216 becomes asympotic with the period axis, the time intervals are paired into groups of two. No appreciable loss of accuracy is caused by this pairing and the pairing results in considerable circuit simplicity as will be evident in the description of the figures.

Figure 16:
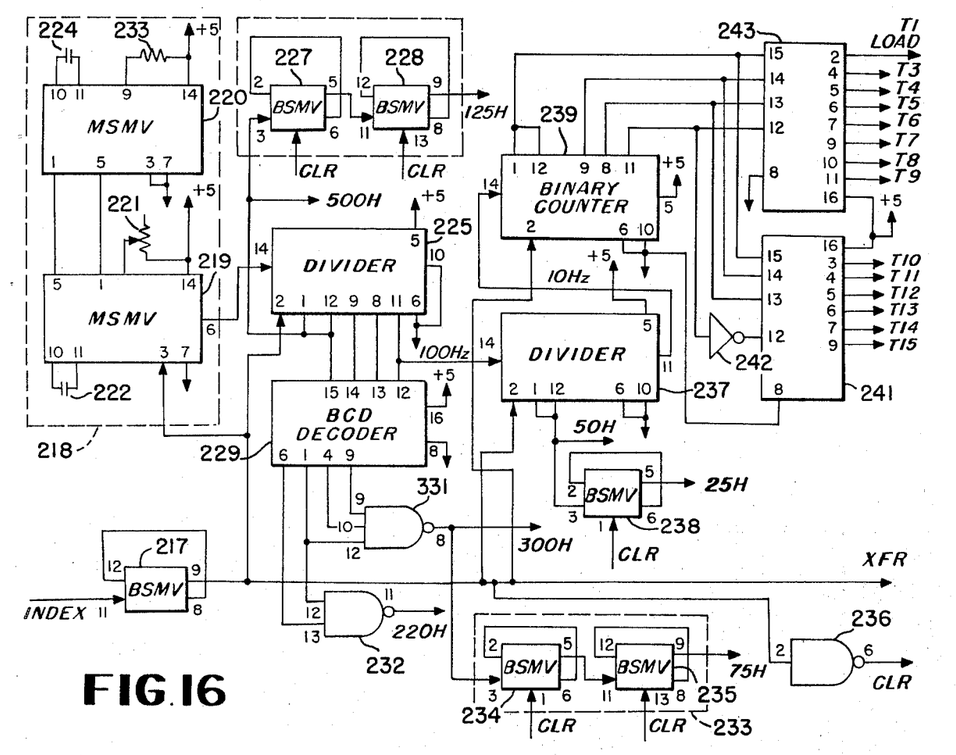
FIG. 16 is a diagramatic showing of the timing section of an alternate readout which may be used with the invention.

Referring to FIG. 16, the timing section of the programmable oscillator is illustrated. As shown, the index pulse coupled to bi-stable multivibrator 217. The output of bi-stable multivibrator 216 is a square wave previously explained in the connection with the other circular arrangements. This signal is used as a start clock signal as well as a transfer signal. Basic clock and timing arrangement of a programmable oscillator also includes a clock oscillator 218 which is comprised by two monostable multivibrators 219 and 220. The frequency of this oscillator is controlled by the resistor 223, potentiometer 221 and capacitors 222 and 224. In the familiar fashion, the frequency of this arrangement is determined by the values of these components and the setting on the potentiometer 221. In the illustrated arrangement potentiometer 221 is adjusted to obtain a clock signal of one KHz. The output of clock circuit 218 is coupled to a divider 225 which divides the one KHz signal by two and by ten. The divide-by-two output provides a 500 Hz signal output and is additionally coupled to divider 226. Divider 226 comprises bi-stable multivibrators 227 and 228 which are connected to divide the 500 Hz signal by four to produce a 125 Hz output as indicated.

Divider 225 is also coupled to a binary code to digital decoder circuit 229. This circuit is, in turn, connected to inverters 231 to produce a 300 Hz output signal and to inverter 232 to produce a 200 Hz output signal. The output of inverter 231 is also coupled to divider circuit 233. Bi-stable multivibrators 234 and 235 comprise divider circuit 233 and, as in the case of bi-stable multivibrators 227 and 228, are connected to produce a divide-by-four output for divider 233. This produces a 75 Hz output signal as indicated.

An inverter 236 is connected to receive the output of bi-stable multivibrator 217 and the output thereof is used as a clear signal.

The 100 Hz output signal from divider 235 is connected to divider 237 which functions in a similar fashion to divider 225 to produce a divide-by-two output of 50 Hz and a divide-by-ten output of 10 Hz. The divide-by-two output of 50 Hz is connected to bistable multivibrator 238 which further divides the signal by two to produce a 25 Hz output signal.

Thus, it will be seen that the timing section produces the requisite frequency outputs shown in FIG. 15. That is, outputs of 500 Hz, 300 Hz, 200 Hz, 125 Hz, 75 Hz, 50 Hz, and 25 Hz are obtained from the various divider and logic circuit outputs.

Figure 17:
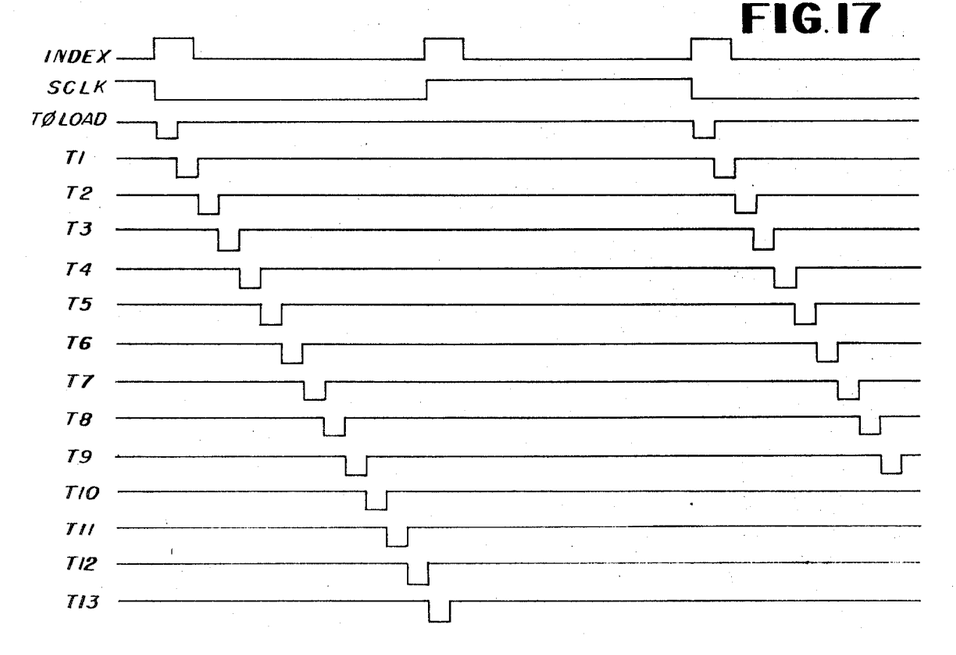
FIG. 17 is a chart showing the timing wave point at selected points of the circuit of FIG. 16.

The 10 Hz output from divider 237 is coupled to binary counter 239. Binary counter 239, in turn, is connected to two zero-to-nine decoders 241 and 243. The illustrated wiring connecting the zero-to-nine counters 241 and 243, including inverter 242, produce a zero-to-sixteen binary decoder. This circuit figuration is, in itself, well understood in the computer science arts. However, for the purpose of completeness, the timing chain produced on the various outputs of decoders 241 and 243 and labeled as T-1 through T-15 are diagrammed in FIG. 17 along with the corresponding index signal and start clock signal.

Figure 18:
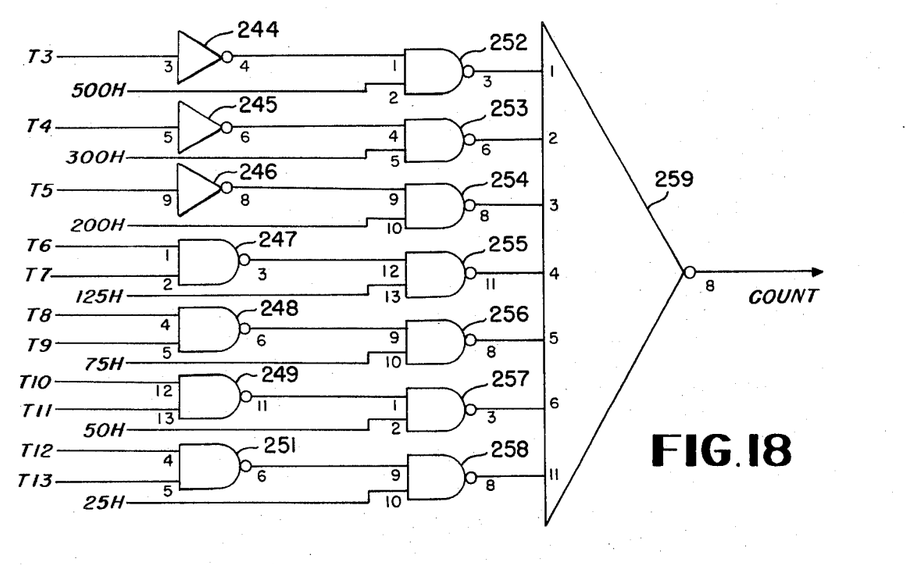
FIG. 18 is a diagramatic showing of the output section to be used with the timing section of FIG. 16.

Referring to FIG. 18, the output section of the programmable oscillator will be described. Signals T-3, T-4 and T-5 are connected to inverters 244, 245, and 246 respectively. Inverters 244, 245 and 246 together with inverter 242, FIG. 16, are component parts of the same integrated module such as hex-inverter 7404. The remaining time outputs signals T-6 and T-7; T-8 and T-9; T-10 and T-11; T-12 and T-13 are connected to inverters 247, 248, 249 and 251 respectively. Conveniently, these inverters are also contained in the same integrated module such as a type 7400, for example. These inverters utilize the time output signals as gating signals and are coupled to inverters 252 through 258 respectively where the various frequency output signals are gated. That is, inverter 252 is gated by the output of inverter 254 to gate 100 milliseconds of the 500 Hz signal connected thereto. Similarly, inverter 253 is gated by inverter 245 to gate 100 milliseconds of the 300 Hz signal connected thereto. In a similar fashion inverter 254 controls the 200 Hz signal, inverter 255 controls the 125 Hz signal, inverter 256 controls the 75 Hz signal, inverter 257 controls the 50 Hz signal and, finally, inverter 258 controls the 25 Hz signal. Each of these increments of the corresponding frequency are amplified by a control amplifier 259 which, for purposes of illustration, may be a type 7430.

Thus, it may be seen that the output from amplifier 259 is a plurality of pulses which vary in number in accordance with the time related recurrence function duration between the index pulses, fed to bi-stable multivibrator 217, FIG. 16. This count then corresponds to the difference between the preloaded 200 count and the actual pulse rate. This count is obtained by the counter and readout circuit shown in FIG. 19.

Figure 19:
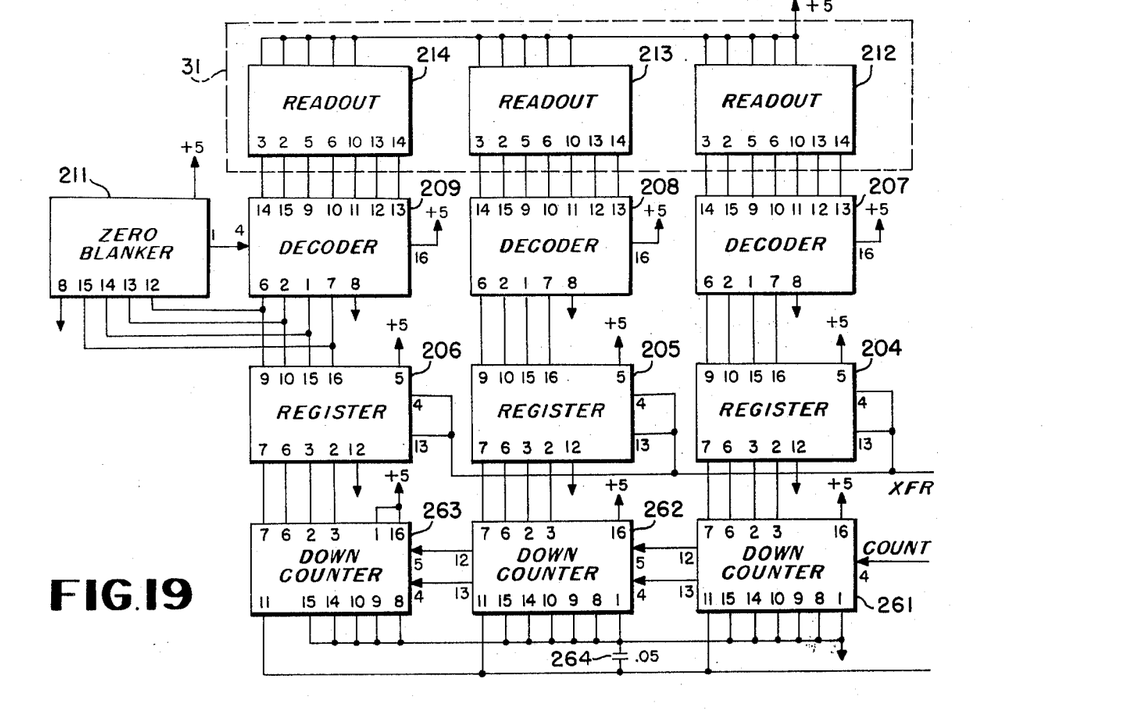
FIG. 19 is a diagramatic showing of the storage and readout circuit used in conjunction with the circuits of FIGS. 16 and 18.

Referring to FIG. 19, the readout circuit used in conjunction with the programmed oscillator of FIG. 16 and 18 is illustrated. As shown, the readout of FIG. 19 is identical to the readout of FIG. 14 with the exception of the counters employed. This is because the counter of FIG. 14 employs a count-up counter such as a type 7490 while the counter of FIG. 19 used a series of up-down counters used in a count-down mode. Therefore, the circuits which are identical to those of FIG. 14 bear the same reference numerals as their previously described counterparts.

As shown, the count signal from amplifier 259 is coupled to counter 261 which, in turn, is connected to counter 262. The output of counter 262 is connected to counter 263. The indicated wiring arrangement biases these three counters to a preloaded count of 200 upon receipt of a load signal which is coupled to pin 11 (assuming type 74192 counters are employed) of each counter. A capacitor 264 is connected between the load input line and ground and it provides high frequency filtration for this signal. At the conclusion of each count interval, the transfer signal generated by bistable multivibrator 217, FIG. 16, is coupled to storage registers 204, 205 and 206 and transfers the count on counters 261, 262 and 263 prior to the arrival of a load signal for the next counting sequence. The output of these registers, which may be circuit types 7475, are transferred to suitable seven segment decoders 207, 208 and 209 which may be, for example, type 7447 circuit modules. As in the circuit of FIG. 14, a zero blank circuit module, which may be type 7442 blanks the output of decoder module 209 when the first significant figure is zero. The display therefore provides a readout of the time related function, termed pulse rate. 7442, As in the previous circuit of FIG. 14, readout tubes 212, 213 and 214 are conventional seven segment readouts. beat This count-down simplification is quite accurate over the accumulated pulse range and has the advantage of nearly instantaneous readout. Further, the pulse rate is recomputed and updated for every other pulse best of patient 22.

Although the foregoing circuit arrangements seem rather complex, modern integrated modular electronic circuit techniques have reduced the amount of wiring and components to the point where the entire circuit may be mounted on circuit boards and, together with the appropriate power supply, may be fitted in an instrument having outside dimensions of 12 inches by 12 inches by 4 inches. A variety of circuit components may be chosen to perform the necessary logic functions covered by the aforedescribed circuits and choice between them is a matter of design to one versed in the electronic arts. However, for purpose of completeness it should be noted that the monostable multivibrators employed in the circuit are circuit types 74121; the bistable multivibrators comprise individual sections of circuit module type 7474; the comparators, as used in the circuit of FIG. 13, may be circuit types 7485; the inverters and gates illustrated may be parts of circuit module types 7400 or 7408; and the storage registers used in the circuit of FIG. 13 may be sections of circuit module type 7474. The adders 169, 171, and 172 have been satisfactorily fabricated from circuit module 7483. Of course, as other circuit modules become available further simplifications in wiring and fabrication techniques may be made in dependence of the choice of appropriate modules.

Likewise, although certain other circuit components such as meter 29 and switches 87, 109, 111, 112, and 119 are illustrated as specific component types. Others may be used, if such substitution is deemed desirable.

Mode of Operation

The internal operation of the respective circuits comprising pulse monitor 21 have been adequately described in connection with the physical description thereof. Since the operation of these circuits follows understood logic and signal processing technology, further description thereof is unnecessary for the understanding of the invention. However, the brief description of the operation of the complete instrument is believed to be helpful in the understanding of the device and the unobvious advantages made possible thereby.

Referring to FIG. 1 and FIG. 2, the patient 22 may be easily coupled to monitor 21 by placement of an external pulse monitor such as ear piece 23 on his person and the placing of his finger within the aperature provided on the back of monitor 21. If the power is on, a pulse rate will immediately appear corresponding to the heart rate of the patient. If this reading is erratic or otherwise suspect, the device may be calibrated for the individual's skin opacity by placing the calibrate switch 111 in the position indicating the channel desired to be calibrated. Then potentiometers 108 A or B are adjusted to center meter 29. When switch 111 is returned to the normal position, a stable pulse reading will appear at readout 31. Readout 32 will indicate the time duration between the arrival of the pulse at the two different monitor positions. If desired, switch 109 may be activated to produce an audible tone in speaker 33 to accompany each pulse beat. The amount of deflection of meter 29 indicates the relative amplitude of the channel selected by readout switch 112.

If desired, switch 119 may be depressed to monitor patient 22's pulse and sound an audible alarm on speaker 34 should the pulse interval drop below the predetermined rate.

If more complete cardiovascular diagnosis is required, an oscilloscope 25 may be connected as illustrated such as to display actual pulse wave forms.

The foregoing description taken together with the appended claims constitute a disclosure such as to enable a person skilled in the biolectronics and data processing arts and having the benefit of the teachings herein to make and use the invention. Further, the structure herein described meets the the objects of invention and generally constitutes a meritorious advance in the art unobvious to such a worker not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A biodynamic instrumentation system comprising:
    sensor means including
        means providing a source of radiant energy,
        an enclosing support means for housing said source of radiant energy on one side thereof and configured to have a channel therein to receive a portion of the anatomy of a living adjacent said source of radiant energy,
        transducer means carried by said enclosing support in a position opposite said source of radiant energy on the other side of said channel such as to be occulted by the reception of the portion of anatomy of the living animal for generating an electrical analog signal of the variations in a light signal caused by circulatory variations in the living animal;
    first circuit means electrically connected to said sensor means for producing a variable magnitude digital index signal in response to the electrical analog signal;
    visual readout means electrically connected to said first circuit means and responsive to the magnitude of the digital index signal for indicating the relative magnitude of the circulatory variations producing the variations of the light signal;
    second circuit means electrically connected to said first circuit means for receipt of the digital index signals therefrom for producing a series of digital pulses of a predetermined frequency and of a duration determined by the interval between the digital signal pulses;
    logic circuit means connected to said second circuit means to receive the digital pulses therefrom and to develop a count signal in response thereto during predetermined intervals of said digital signal pulses;
    register circuit means connected to said logic circuit means for storage of the count developed by said logic circuit means during intervals when said logic circuit is developing the count signal; and
    visual display means connected to said register circuit means for indicating a time related function of the variations in the circulatory system of the animal in response to the count stored in said register circuit means.

2. A biodynamic instrumentation system according to claim 1 further including:
    audio circuit means effectively connected to said first circuit means and receiving said digital index signals therefrom for generating an audible tone in response to each of the digital index pulses.

3. A biodynamic instrumentation system according to claim 1 further including:
    alarm circuit means electrically connected to said first circuit means for producing a signal in response to variations in said digital index from a predetermined rate.

4. A biodynamic instrumentation system according to claim 1 in which said sensor means includes a plurality of means configured and interconnected to permit placement at spaced intervals on the living animal.

5. A biodynamic instrumentation system according to claim 4 in which said first circuit means comprises a plurality of analog-to-digital signal processing means equal in number to the the number of sensor means and each connected to an associated one of said sensor means for producing a digital index signal in response to the electrical analog signal generated by each sensor means.

6. A biodynamic instrumentation system according to claim 5 in which each of said analog-to-digital processing means includes an amplifier and an output terminal connected thereto for providing an external output of an amplified analog signal.

7. A biodynamic instrumentation system according to claim 4 further including:
    an electrical contact in each sensor means and positioned to contact the living animal for obtaining an electrocardiogram signal therefrom;
    amplifier circuit means connected to each electrocardiogram electrode to receive the obtained signal therefrom for increasing the magnitude thereof; and
    electrical connector means connected to said amplifier circuit means and configured to cooperate with a standard electrocardiograph display for providing a display of the signals picked up by the electrical contacts in each sensor means which may be viewed in conjunction with the display of the time related function by the aforesaid visual display means.

8. A biodynamic instrumentation system according to claim 1 in which said logic circuit means includes a gated clock signal generating means for developing a count signal which is indicative of the period between pulses.

9. A biodynamic instrumentation system according to claim 8 in which the aforesaid logic circuit means includes a divider means for dividing the count signal which is indicative of the period between pulses into a constant to obtain a time rate signal corresponding to the pulse rate of the living animal.

10. A biodynamic instrumentation system according to claim 8 in which the aforesaid logic circuit means further includes:
a programmed oscillator means controlled by said count signal for producing predetermined oscillations; and
a count-down counter means connected to said programmed oscillator means for counting the predetermined oscillations thereof and preloaded to a predetermined value corresponding to the maximum pulse rate expected in the living animal.

* * * * *